(12) United States Patent
Weiner et al.

(10) Patent No.: US 12,425,343 B2
(45) Date of Patent: Sep. 23, 2025

(54) METHODS, SYSTEMS, AND COMPUTER PROGRAM PRODUCTS FOR DYNAMIC LOAD BALANCING

(71) Applicant: Mellanox Technologies, Ltd., Yokneam (IL)

(72) Inventors: Michael Weiner, Nes Ziona (IL); Avi Urman, Yokneam (IL); Gary Mataev, Haifa (IL); Idan Burstein, Akko (IL)

(73) Assignee: Mellanox Technologies, Ltd., Yokneam (IL)

( * ) Notice: Subject to any disclaimer, the term of this patent is extended or adjusted under 35 U.S.C. 154(b) by 349 days.

(21) Appl. No.: 17/875,999

(22) Filed: Jul. 28, 2022

(65) Prior Publication Data

US 2024/0039849 A1 Feb. 1, 2024

(51) Int. Cl.
*H04L 47/125* (2022.01)
*H04L 47/32* (2022.01)
*H04W 28/08* (2023.01)

(52) U.S. Cl.
CPC ............ *H04L 47/125* (2013.01); *H04L 47/32* (2013.01); *H04W 28/08* (2013.01)

(58) Field of Classification Search
CPC ...... H04L 47/125; H04L 47/32; H04W 28/08; H04W 28/084; H04W 36/22; H04W 72/12
See application file for complete search history.

(56) References Cited

U.S. PATENT DOCUMENTS

| | | | |
|---|---|---|---|
| 2001/0023455 A1* | 9/2001 | Maeda | H04L 47/10 709/224 |
| 2012/0041965 A1* | 2/2012 | Vasquez | H04L 47/125 707/E17.037 |
| 2017/0286157 A1* | 10/2017 | Hasting | G06F 9/5038 |
| 2019/0204894 A1* | 7/2019 | Jahagirdar | G06F 1/324 |

(Continued)

FOREIGN PATENT DOCUMENTS

JP 2002091843 A * 3/2002

OTHER PUBLICATIONS

JP2002091843A_Google_English_Translation (Year: 2024).*

(Continued)

*Primary Examiner* — Ji-Hae Yea
(74) *Attorney, Agent, or Firm* — Michael M. McCraw; Moore & Van Allen PLLC

(57) ABSTRACT

Methods, systems, and computer program products for selecting packing processing cores are provided. An example system includes a plurality of packet processing cores and a load balancing unit communicatively connected to the plurality of packet processing cores. The load balancing unit is configured to receive a workflow packet including packet description data indicative of at least a packet structure and a packet priority and receive, from the plurality of packet processing cores, state data indicative of at least a utilization state and an operating state of each of the respective packet processing cores. The load balancing unit determines a selected packet processing core from amongst the plurality of packet processing cores based on the state data of the packet processing core and the packet description data of the workflow packet and transmits the workflow packet to the selected packet processing core.

20 Claims, 10 Drawing Sheets

(56) References Cited

U.S. PATENT DOCUMENTS

2022/0051135 A1* 2/2022 Wu .................. H04W 28/0284

OTHER PUBLICATIONS

Shehabi, Arman et al., "United States Data Center Energy Usage Report". 2023 Energy Technologies Area, Lawrence Berkeley National Laboratory, Jun. 2016 [online]. Retrieved from the internet <https://eta.lbl.gov/publications/united-states-data-center-energy>.

* cited by examiner

METHODS, SYSTEMS, AND COMPUTER PROGRAM PRODUCTS FOR DYNAMIC LOAD BALANCING

TECHNOLOGICAL FIELD

Embodiments of the present disclosure relate generally to networking systems, and, more particularly, to the dynamic distribution of system operations in distributed networking environments.

BACKGROUND

Computer systems are often employed in networking environments in order to manage network traffic. Network traffic, however, may vary widely in terms of the type of data being transmitted, the frequency of the transmitted packets, the protocol or encoding of a packet, and/or the like. Furthermore, many computer systems employed to manage network traffic utilize or otherwise access a plurality of processing cores, each having distinct operational capabilities. Through applied effort, ingenuity, and innovation, many of the problems associated with conventional networking systems have been solved by developing solutions that are included in embodiments of the present disclosure, many examples of which are described in detail herein.

BRIEF SUMMARY

Embodiments of the present disclosure provide for methods, systems, apparatuses, and computer program products for dynamic distribution of system operations in distributed networking environments. An example computer-implemented method may include receiving a workflow packet that may include packet description data indicative of at least a packet structure and a packet priority. The method may further include receiving, from a plurality of packet processing cores, state data indicative of at least a utilization state and an operating state of each of the respective packet processing cores from amongst the plurality of packet processing cores. The method may further include determining a selected packet processing core from amongst the plurality of packet processing cores based on the state data of the packet processing core and the packet description data of the workflow packet and transmitting the workflow packet to the selected packet processing core.

In some embodiments, the state data indicative of the utilization state may define a processor utilization value for each of the plurality of packet processing cores. In such an embodiment, determining the selected packet processing core from amongst the plurality of packet processing cores may further include comparing the processor utilization values of the plurality of packet processing cores and determining the selected packet processing core based upon the comparison of the processor utilization values.

In some further embodiments, the state data indicative of the utilization state further may define a memory utilization value for each of the plurality of packet processing cores. In such an embodiment, determining the selected packet processing core from amongst the plurality of packet processing cores may further include comparing the memory utilization values of the plurality of packet processing cores and updating the selected packet processing core based upon the comparison of the memory utilization values.

In some embodiments, the state data indicative of the utilization state may define a plurality of power states for each of the plurality of packet processing cores including at least a first power state associated with a first operating frequency and a second power state associated with a second operating frequency. In such an embodiment, determining the selected packet processing core from amongst the plurality of packet processing cores may further include comparing the power states of the plurality of packet processing cores and determining the selected packet processing core based upon the comparison of the power states.

In some still further embodiments, the state data indicative of the operating state may define a physical distance between the respective packet processing core and a load balancing unit for each of the plurality of packet processing cores. In such an embodiment, determining the selected packet processing core from amongst the plurality of packet processing cores may further include comparing the physical distance from the load balancing unit of the plurality of packet processing cores and updating the selected packet processing core based upon the comparison of the physical distance.

In some embodiments, the packet description data indicative of packet priority may define a plurality of priority categories including at least a first priority category and a second priority category. In such an embodiment, determining the selected packet processing core may further include comparing the state data of the plurality of packet processing cores and determining the selected packet processing core based upon the priority category of the workflow packet and the comparison of the state data of the plurality of packet processing cores.

In some embodiments, the packet description data indicative of packet priority may define a packet source. In such an embodiment, determining the selected packet processing core may further include comparing the state data of the plurality of packet processing cores and determining the selected packet processing core based upon the packet source of the workflow packet and the comparison of the state data of the plurality of packet processing cores.

In any embodiment, the computer-implemented method may further include iteratively determining the selected packet processing core using a reinforcement learning algorithm.

BRIEF DESCRIPTION OF THE DRAWINGS

Having thus described certain example embodiments of the present disclosure in general terms, reference will now be made to the accompanying drawings. The components illustrated in the figures may or may not be present in certain embodiments described herein. Some embodiments may include fewer (or more) components than those shown in the figures.

Figure 1:
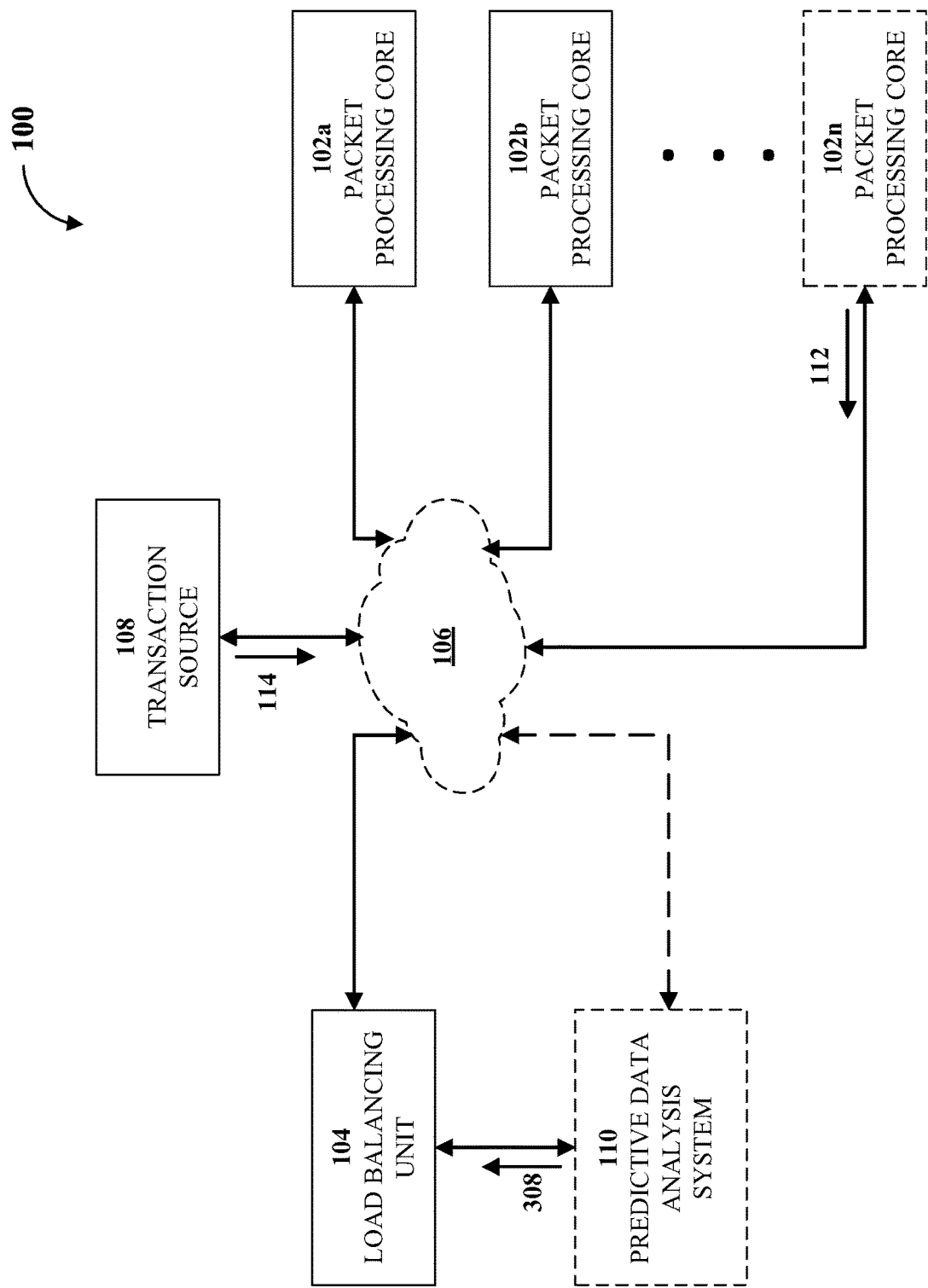

FIG. 1 illustrates an example system for distributing system operations, in accordance with one or more embodiments of the present disclosure.

Figure 2:
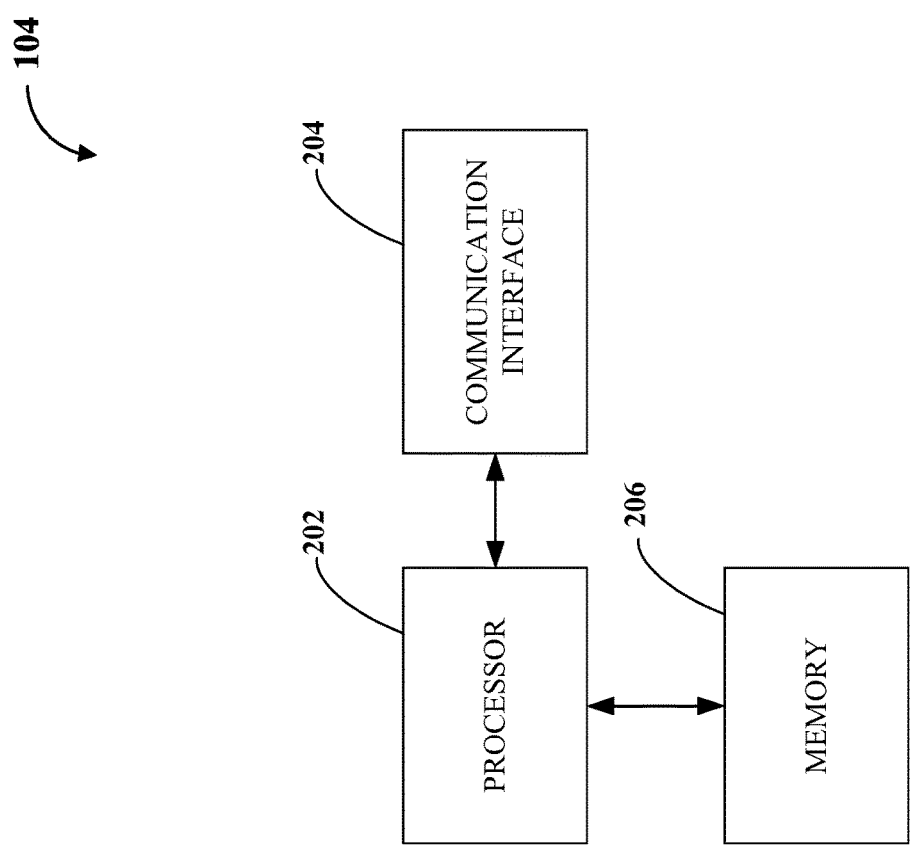

FIG. 2 provides a block diagram of an apparatus that may be specifically configured in accordance with an example embodiment of the present disclosure.

Figure 3:
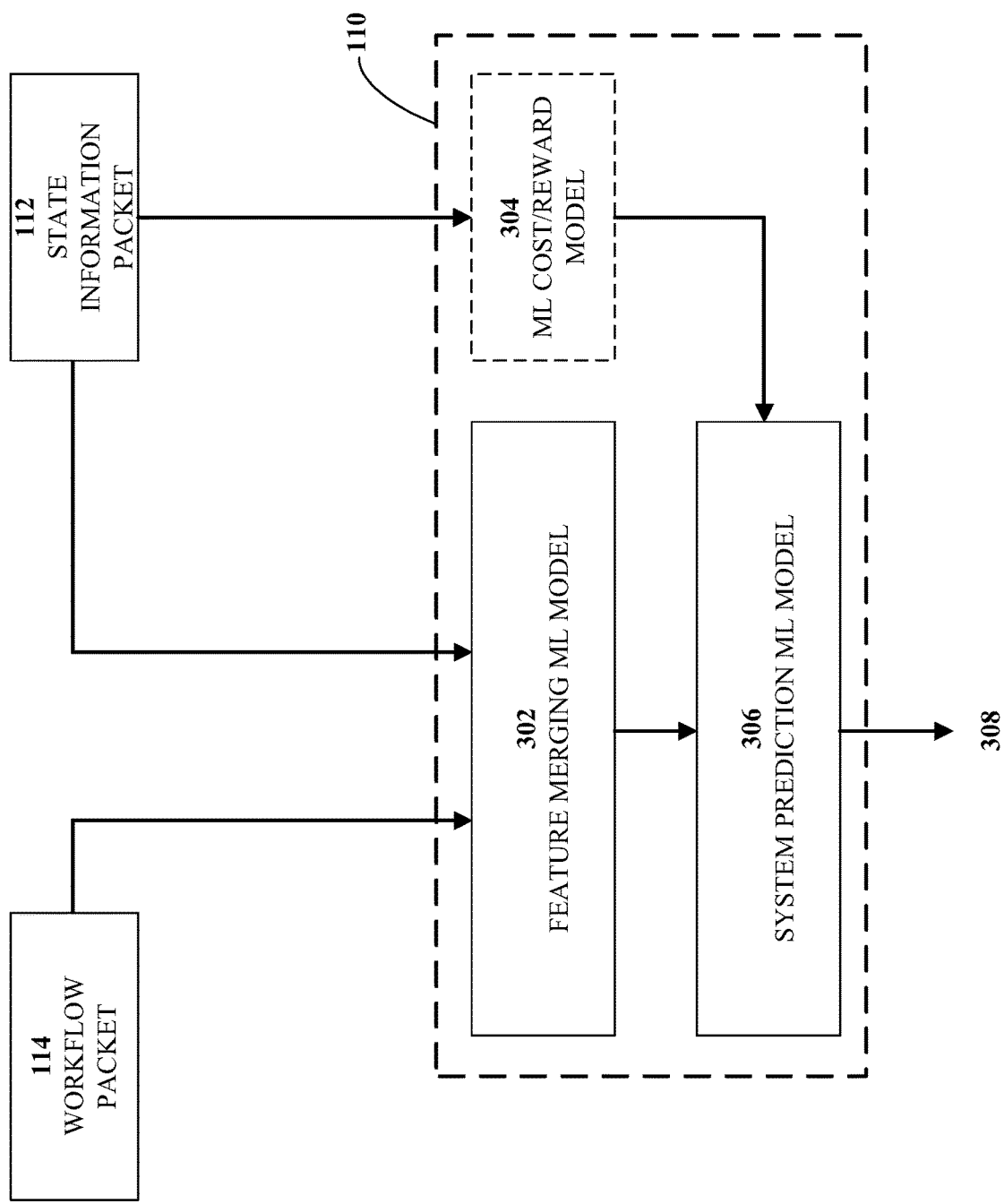

FIG. 3 is a data diagram of an example process for generating a workflow packet distribution policy, in accordance with some embodiments discussed herein.

Figure 4:
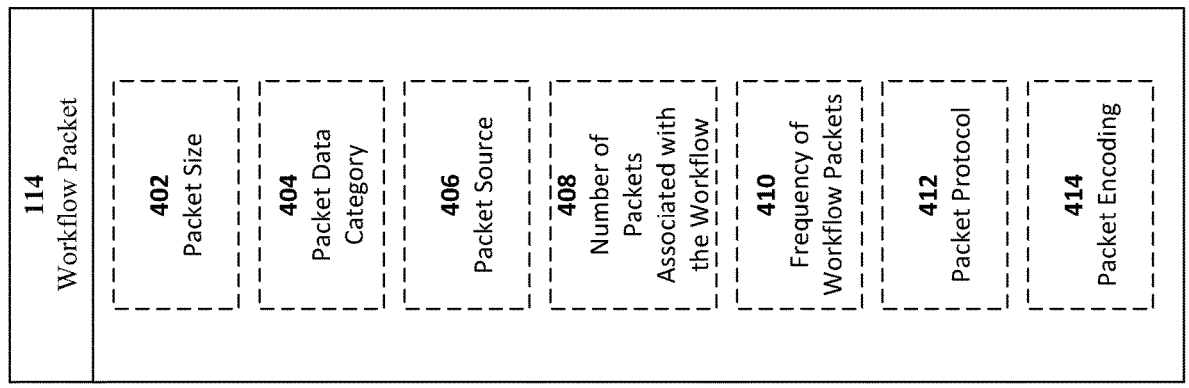

FIG. 4 is a data diagram of an example workflow packet, in accordance with some embodiments of the present disclosure.

Figure 5:
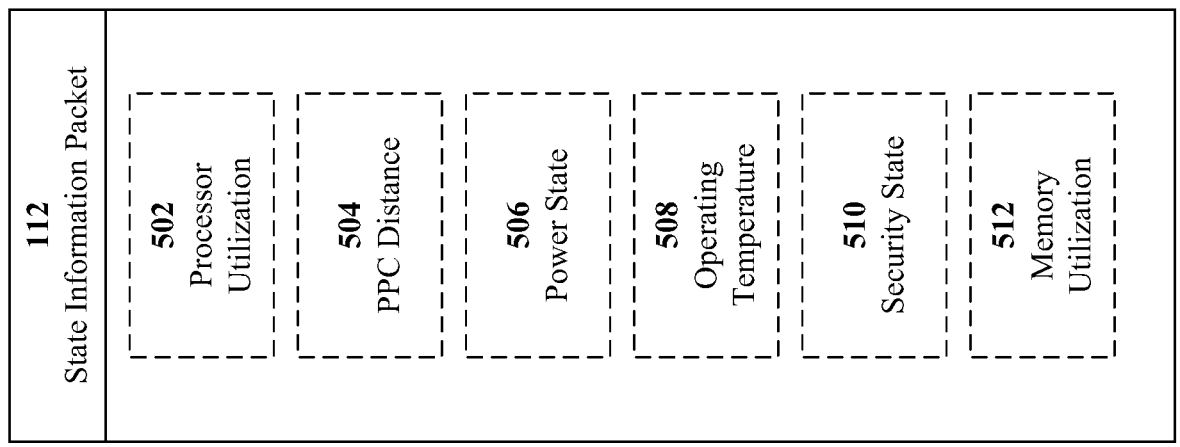

FIG. 5 is a data diagram of an example state information packet, in accordance with some embodiments of the present disclosure.

Figure 6:
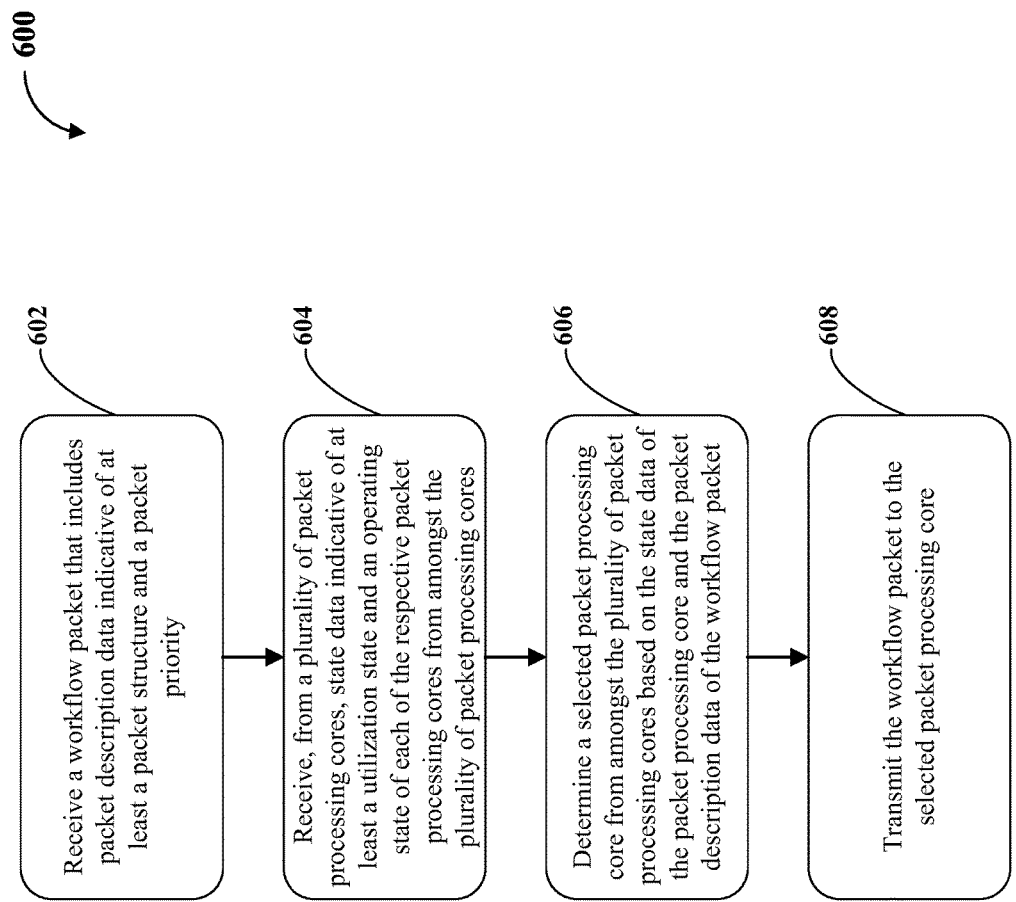

FIG. 6 illustrates a flow diagram for selecting a packet processing core to process a workflow packet, in accordance with some embodiments of the present disclosure.

Figure 7:
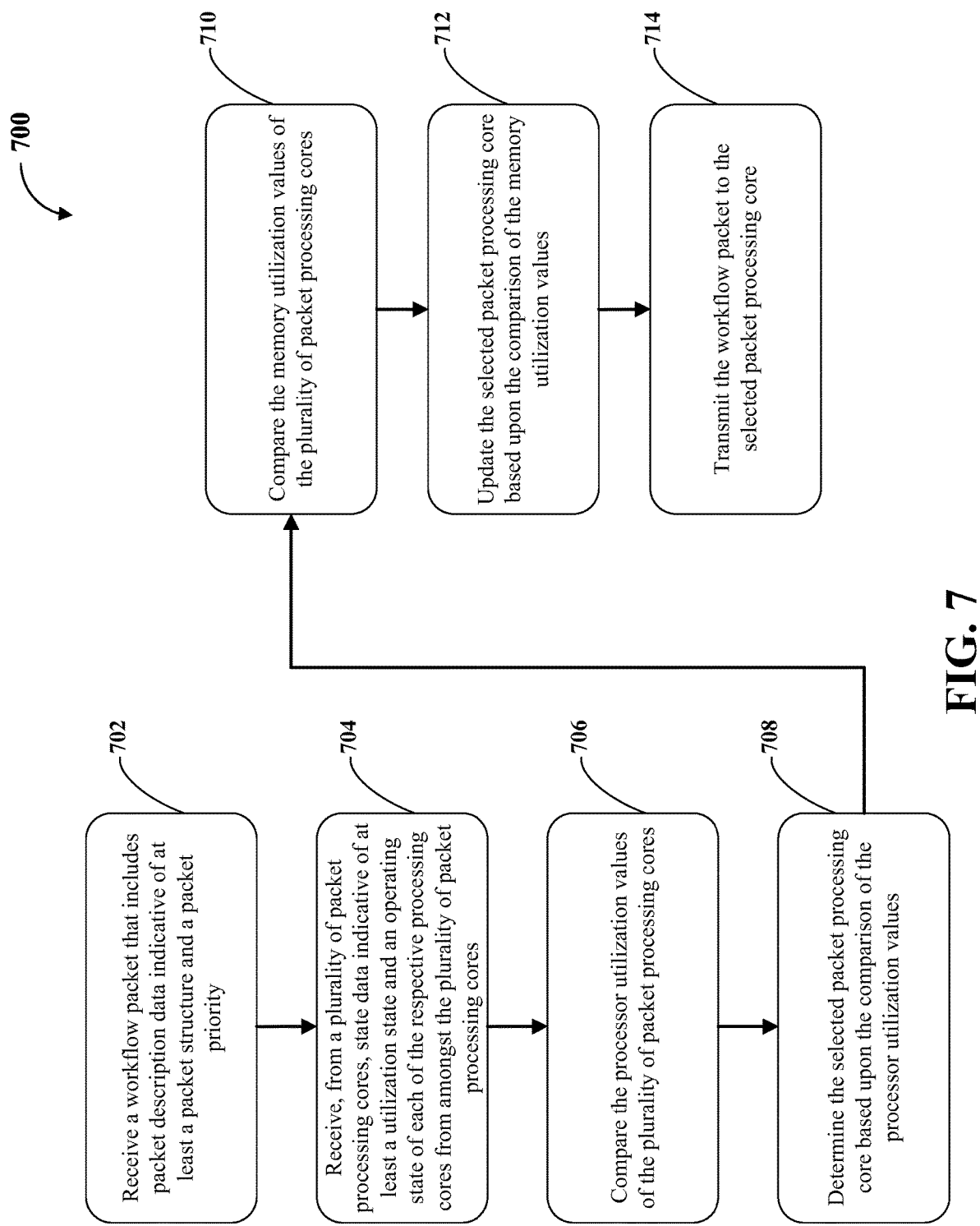

FIG. 7 illustrates a flow diagram for selecting a packet processing core to process a workflow packet based on processor and memory utilization, in accordance with some embodiments of the present disclosure.

Figure 8:
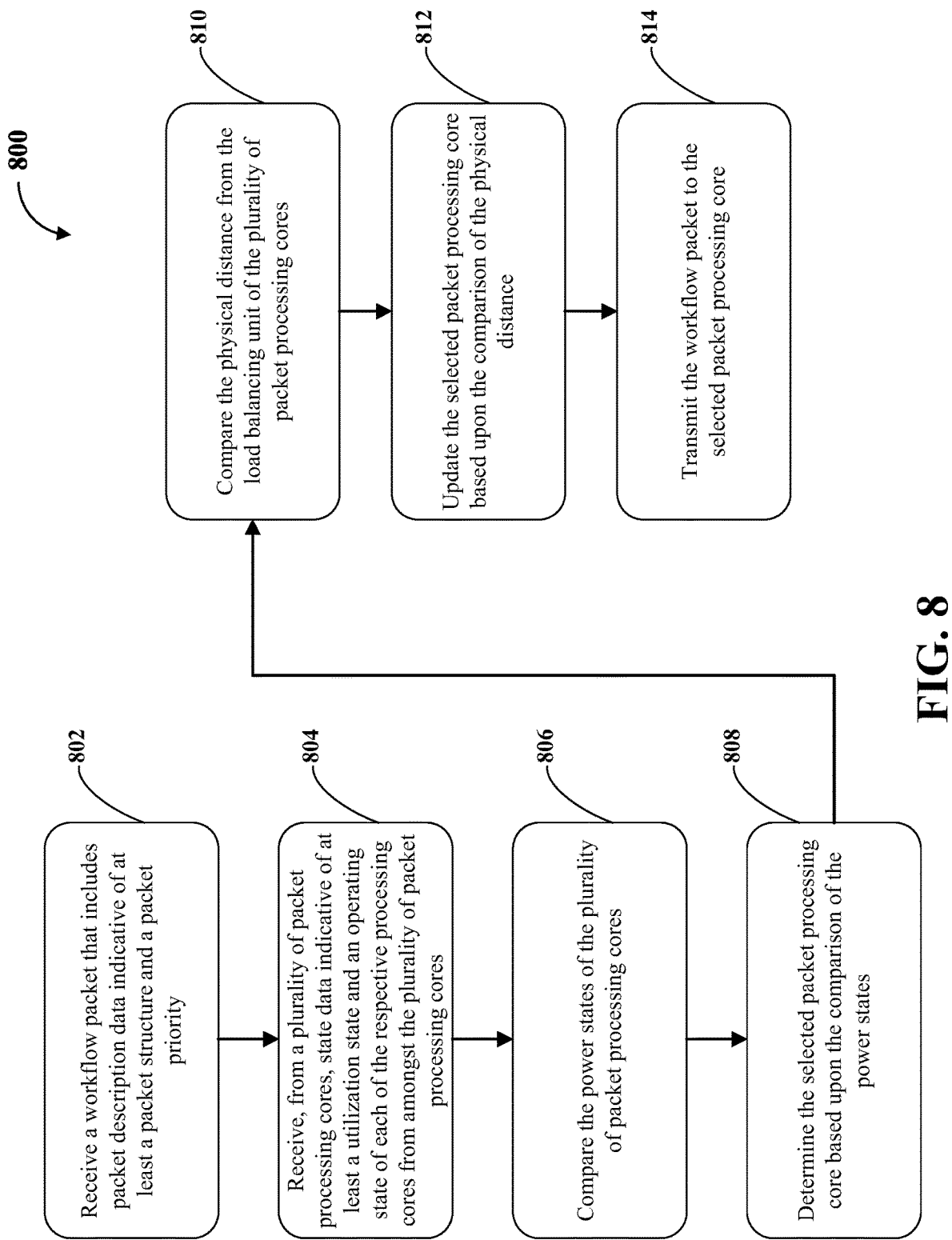

FIG. 8 illustrates a flow diagram for selecting a packet processing core to process a workflow packet based on power state and physical distance, in accordance with some embodiments of the present disclosure.

Figure 9:
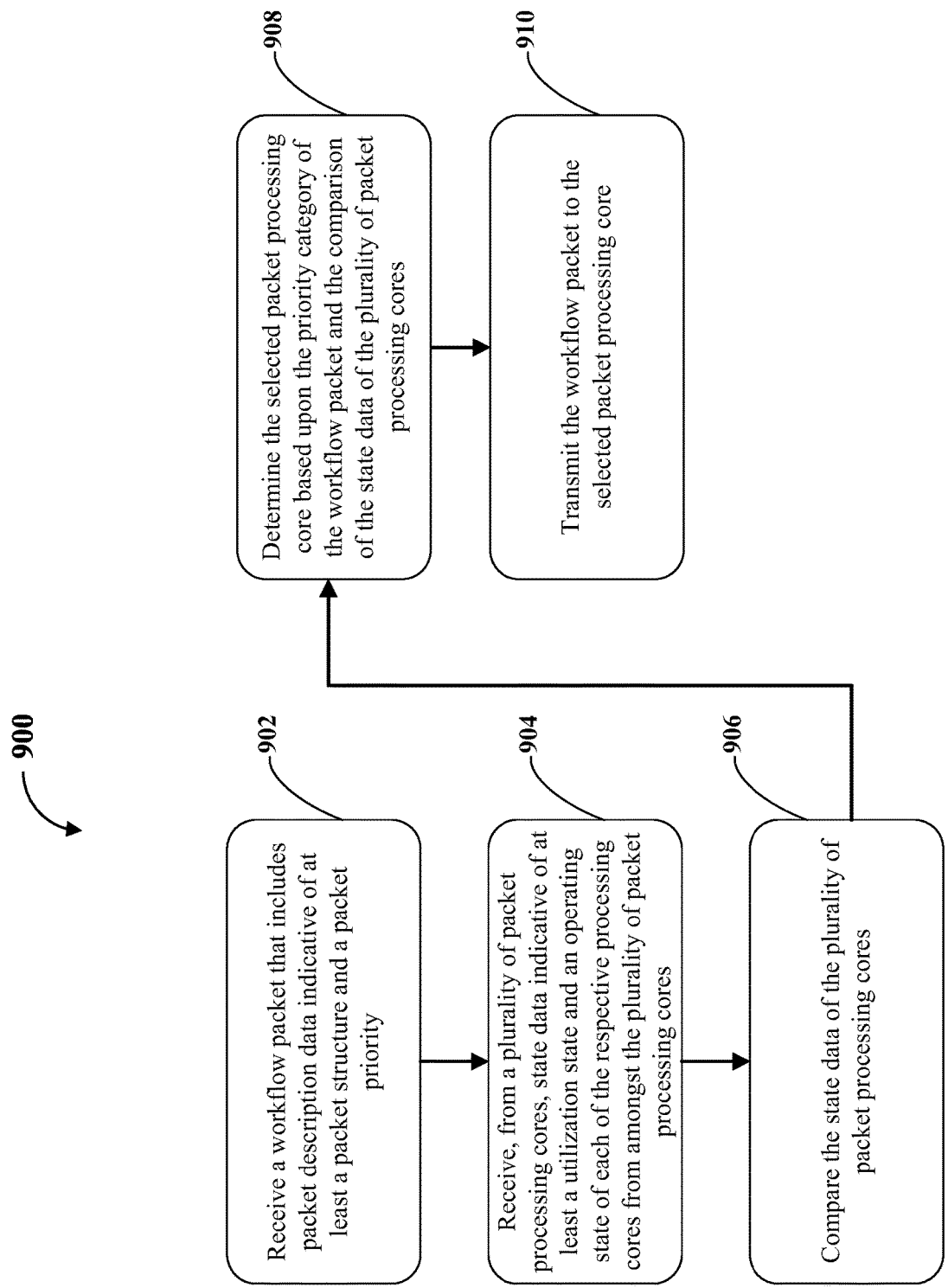

FIG. 9 illustrates a flow diagram for selecting a packet processing core to process a workflow packet based on packet priority category, in accordance with some embodiments of the present disclosure.

Figure 10:
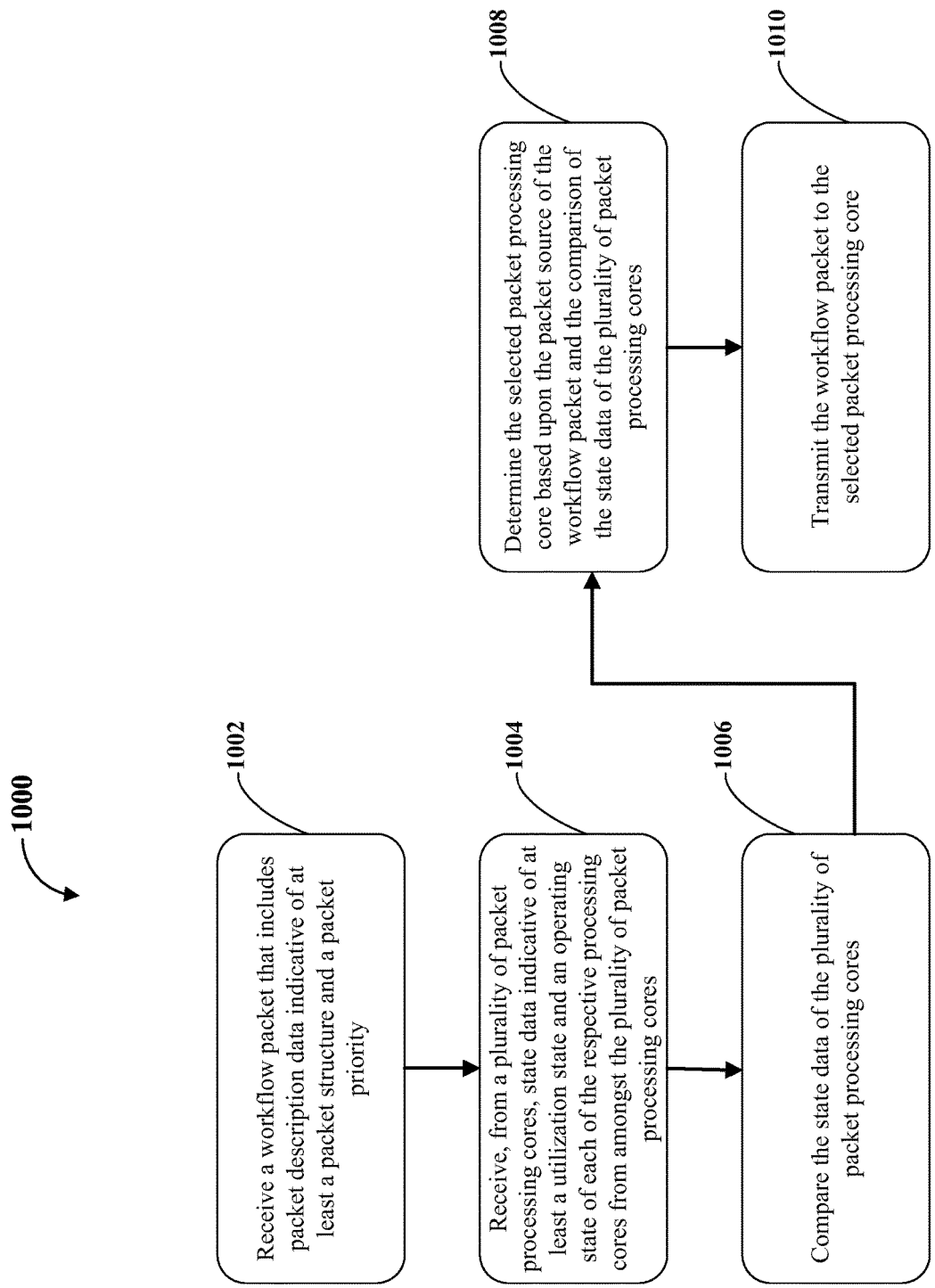

FIG. 10 illustrates a flow diagram for selecting a packet processing core to process a workflow packet based on packet source, in accordance with some embodiments of the present disclosure.

DETAILED DESCRIPTION

Overview

Various embodiments of the present disclosure will now be described more fully hereinafter with reference to the accompanying drawings in which some but not all embodiments are shown. Indeed, the present disclosure may be embodied in many different forms and should not be construed as limited to the embodiments set forth herein; rather these embodiments are provided so that this disclosure will satisfy applicable legal requirements. Like reference numerals refer to like elements throughout.

The methods, apparatus, and computer program products provided according to the example embodiments of the present disclosure for managing the distribution of computer transactions among a plurality of processing nodes to improve system performance. In general, when managing a flow of computer transactions and a plurality of processing cores, a computer system may need to determine to which core a particular computer transaction may be routed. Improper routing may lead to bottlenecks in the processing flow and poor performance of the computer system. Improper routing may also lead to overutilization of a particular processing core causing the core to switch into an elevated power state and consume more power. As such, it is desirable to distribute computer transactions in such a way to prevent unnecessary power usage, while maintaining sufficient performance.

There are a number of deficiencies and problems associated with present methods and systems for distributing computer transactions. For example, current solutions may only distribute transactions evenly amongst the cores, such as in an in a "round-robin" fashion. Because not all network transactions require equal processing time and because not all processing cores maintain equal performance, this approach often results in the under-utilization of some processing cores while other cores are over-utilized. Poor distribution of computer transactions further results in increased power consumption for over-utilized cores that must shift into a higher performance state and may also result in increased latency because some processing cores are underutilized. Computer systems utilizing such algorithms to distribute computer transactions may suffer from inefficient power utilization and/or insufficient performance.

Accordingly, the embodiments described herein provide methods, systems, and computer program products in which a load balancing unit may receive computer operations and determine the proper distribution to improve performance of the computer system. Utilizing information contained in the computer transaction packets and feedback from the processing cores, a load balancing unit may determine the destination packet processing core (PPC) to improve system performance. In some embodiments, the load balancing unit may utilize a machine learning (ML) algorithm, such as a reinforced learning algorithm, neural network, supervised or unsupervised learning, and/or the like to dynamically determine the distribution of a given set of computer transactions in real-time or substantially real-time.

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein as receiving data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein as sending data to another computing device, it will be appreciated that the data may be sent directly to another computing device or may be sent indirectly via one or more intermediary computing devices, such as, for example, one or more servers, relays, routers, network access points, base stations, hosts, and/or the like.

Embodiments of the present disclosure are described below with reference to block diagrams and flowchart illustrations. Thus, it should be understood that each block of the block diagrams and flowchart illustrations may be implemented in the form of a computer program product; an entirely hardware embodiment; an entirely firmware embodiment; a combination of hardware, computer program products, and/or firmware; and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

The terms "illustrative," "exemplary," and "example" as may be used herein are not provided to convey any qualitative assessment, but instead merely to convey an illustration of an example. Thus, use of any such terms should not be taken to limit the spirit and scope of embodiments of the present disclosure. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment).

Dynamic Load Balancing System

FIG. 1 illustrates a dynamic load balancing system 100 as an example system for managing the distribution of workflow packets 114 in a computing system. It will be appreciated that the dynamic load balancing system 100 is provided as an example of an embodiment(s) and should not be construed to narrow the scope or spirit of the disclosure. The depicted dynamic load balancing system 100 of FIG. 1 may include a load balancing unit 104 capable of receiving workflow packets 114 from communicatively connected sources. The load balancing unit 104 may be further communicatively connected to two or more packet processing cores 102a-n (e.g., a plurality of processing cores 102a-102n) by a communication network 106. The communication network 106 may also support the transmission of state information packets 112. The load balancing unit 104 may, in some embodiment, be communicatively connected to a predictive data analysis system 110.

As described herein, the load balancing unit 104 may be configured to receive workflow packets 114 from a transaction source 108 and schedule the transaction source 108 for processing with a processing core 102. The load balancing unit 104 may be embodied in an entirely hardware embodiment, an entirely computer program product embodiment, an entirely firmware embodiment (e.g., application-specific integrated circuit, field-programmable gate array, etc.), and/or an embodiment that comprises a combination of computer program products, hardware, and firmware.

The dynamic load balancing system 100 further includes the plurality of packet processing cores 102a-n as described above. Each packet processing core 102 may be communicatively connected to the load balancing unit 104 through a communication network 106 and may be configured to receive workflow packets 114 from the load balancing unit 104 and other transaction sources 108. Each packet processing core 102 may be configured to decode, process, and carry out any actions related to the received workflow packet 114. A packet processing core 102 may be capable of monitoring and communicating state information relative to the utilization and operation of the packet processing core 102. For example, a packet processing core 102 may be capable of determining the processor utilization, the physical distance between the load balancing unit 104 and the packet processing core 102, the number of network nodes between the load balancing unit 104 and the packet processing core 102, the total and available memory capacity or memory utilization, the operating temperature, the security state, the power state, and/or other parameters related to the operation of the packet processing core 102. In some embodiments, one or more of the parameters may be configured by a user or an external source. A packet processing core 102 may be further capable of transmitting the collected state information to the load balancing unit 104 through the communication network 106.

Each packet processing core 102 may be embodied in an entirely hardware embodiment, an entirely computer program product embodiment, an entirely firmware embodiment (e.g., application-specific integrated circuit, field-programmable gate array, etc.), and/or an embodiment that comprises a combination of computer program products, hardware, and firmware. In some embodiments, one or more of the packet processing cores 102 may be embodied on the same physical device as the load balancing unit 104. In some embodiments, one or more packet processing cores 102 may be remote to the dynamic load balancing system 100. Still, in some embodiments, one or more packet processing cores 102 may be located on the same physical device as the dynamic load balancing system 100 and one or more packet processing cores 102 may be remote to the dynamic load balancing system 100 and connected through a communication network 106.

FIG. 1 further depicts a workflow packet 114. The workflow packet 114 (e.g., a plurality of workflow packets 114 received by the system 100) may be any computer operation or transaction requiring processing by a packet processing core 102. The workflow packet 114 may include data indicative of, for example, system transactions/operations, network put/post commands, network read/write commands, network atomic commands, direct memory access (DMA) commands, remote direct memory access (RDMA) read/write commands, compression, encryption, and/or similar network or system operations. The workflow packet 114 may include a plurality of data packets transmitted and received separately. A workflow packet 114 may contain information identifying the data packet characteristics related to, among other things, the workflow packet's 114 packet structure and packet priority as defined herein. For example, a workflow packet 114 may contain data indicative of the number of packets associated with the workflow, the type of data contained in the data packets, the source of the workflow packet 114, the size of the data packet, the frequency of the packets, the protocol associated with the workflow packet 114, the encoding of the workflow packet 114, the packet data category and associated priority, and/or other identifying information of the packet, workflow, or data structure. In some embodiments the identifying packet information may be contained in the header or footer of the transmitted workflow packet 114. In some embodiments, the identifying packet information may be inferred from the information contained in the header. Still, in some embodiments, the identifying packet information may be determined via a machine learning and/or artificial intelligence technique.

The communication network 106 may be any means including hardware, software, devices, or circuitry that is configured to support the transmission of computer messages between system nodes. For example, the communication network 106 may be formed of components supporting wired transmission protocols, such as, digital subscriber line (DSL), Ethernet, fiber distributed data interface (FDDI), or any other wired transmission protocol obvious to a person of ordinary skill in the art. The communication network 106 may also be comprised of components supporting wireless transmission protocols, such as Bluetooth, IEEE 802.11 (Wi-Fi), or other wireless protocols obvious to a person of ordinary skill in the art. In addition, the communication network 106 may be formed of components supporting a standard communication bus, such as, a Peripheral Component Interconnect (PCI), PCI Express (PCIe or PCI-e), PCI eXtended (PCI-X), Accelerated Graphics Port (AGP), or other similar high-speed communication connection. Further, the communication network 106 may be comprised of any combination of the above mentioned protocols. In some embodiments, such as when the packet processing cores 102a-n and the load balancing unit 104 are formed as part of the same physical device, the communication network 106 may include the on-board wiring providing the physical connection between the component devices.

The transaction source 108 may be any device capable of communicating system operations, such as those contained in the workflow packet 114, to a network device. For example, the transaction source 108 may be formed as a server, central processing unit, peripheral device, sensor, a network interface card, a network client, hub, switch, router, or any other device capable of generating or relaying computer operations. In some embodiments, a plurality of transaction sources 108 may be connected to the communication network 106, all of which are capable of transmitting workflow packets 114 requiring processing by the dynamic load balancing system 100.

In some embodiments, the system 100 may further include predictive data analysis system 110. The predictive data analysis system 110 may be any machine learning (ML) module, neural network, artificial intelligence based system, and/or the like capable of receiving inputs and generating a system action based on those inputs. In some embodiments, the predictive data analysis system 110 may include a supervised or an unsupervised ML algorithm, for example, a reinforcement learning (RL) algorithm. The example RL algorithm may receive as inputs information gathered from the state information packets 112 and workflow packets 114, such as the number of packets associated with the workflow packet 114, the type of data contained in the data packets, the source of the workflow packet 114, the size of the data packet, the frequency of the packets, the protocol associated with the workflow packet 114, the encoding of the workflow packet 114, the packet data category and associated priority; the processor utilization, memory utilization, and power state of each of the packet processing cores 102a-n; the physical distance from the packet processing core 102 to the load balancing unit 104; the temperature of any of the components described herein, the security state, and/or the like. These received inputs indicate characteristics of the workflow packet 114 and represent the state of the environment. Based on the workflow packet 114 information and the state of the environment, a policy may be generated. In some embodiments, the policy may be a determination of the network node preferred for processing a workflow packet 114. In addition, the predictive data analysis system 110 may receive performance data from the packet processing cores 102a-n, such as power consumption and latency. This performance data may represent the reward function of the reinforcement learning algorithm. Utilizing reinforcement learning techniques, including exploration and exploitation policies, the predictive data analysis system 110 may initialize and update a policy dictating the scheduling of workflow packets 114 based on the data determined from the workflow packet 114 and further based on the state information packets 112.

Although the predictive data analysis system 110 is described primarily in the context of an RL algorithm, it should be understood that any of a variety of artificial intelligence techniques and/or learning mechanisms may be utilized, including Model Predictive Control, Genetic Algorithms, Particle Swarm Optimization, Simulated Annealing, grid search, and/or a variety of other techniques and methodologies to supervised or unsupervised learning, to reach a desired workflow scheduling policy as described herein. Furthermore, the embodiments described herein may leverage one or more artificial neural networks, convolutional neural networks, generative adversarial networks, recurrent neural networks, etc. based upon the intended application of the predictive data analysis system 110.

The state information packet 112 may be any formatted unit of data capable of transmission on the communication network 106 containing state information of the associated packet processing core 102. In some embodiments, the state information packet 112 may contain data pertaining to the operational state and utilization state of a particular packet processing core 102. In some embodiments, the state information packet 112 may include processor utilization, the physical distance between the load balancing unit 104 and the packet processing core 102, the number of network nodes between the load balancing unit 104 and the packet processing core 102, the total and available memory capacity or memory utilization, the operating temperature, the security state, the power state, and/or other parameters related to the operation of the packet processing core 102.

One example of a load balancing unit 104 that may be configured to function in a dynamic load balancing system 100 is depicted in FIG. 2. As shown in FIG. 2, the load balancing unit 104 may include, be associated with or be in communication with processor 202, a memory 206, and a communication interface 204. The processor 202 may be in communication with the memory 206 via a bus for passing information among components of the apparatus load balancing unit 104. The memory 206 may be non-transitory and may include, for example, one or more volatile and/or non-volatile memories. In other words, for example, the memory 206 may be an electronic storage device (e.g., a computer readable storage medium) comprising gates configured to store data (e.g., bits) that may be retrievable by a machine (e.g., a computing device like the processing circuitry). The memory 206 may be configured to store information, data, content, applications, instructions, or the like for enabling the apparatus to carry out various functions in accordance with an example embodiment of the present disclosure. For example, the memory 206 could be configured to buffer input data for processing by the processor 202. Additionally or alternatively, the memory 206 could be configured to store instructions for execution by the processor 202.

The apparatus load balancing unit 104 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processor 202 may be configured to execute instructions stored in the memory 206 or otherwise accessible to the processor 202. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processor 202 is embodied as an executor of instructions, the instructions may specifically configure the processor to perform the algorithms and/or operations described herein when the instructions are executed. However, in some cases, the processor 202 may be a processor of a specific device configured to employ an embodiment of the present disclosure by further configuration of the processing circuitry by instructions for performing the algorithms and/or operations described herein. The processor 202 may include, among other things, a clock, an arithmetic logic unit (ALU) and logic gates configured to support operation of the processing circuitry.

The communication interface 204 may be any means such as a device or circuitry embodied in either hardware or a combination of hardware and software that is configured to receive and/or transmit data, including media content in the form of video or image files, one or more audio tracks or the like. In this regard, the communication interface 204 may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

FIG. 3 illustrates an example predictive data analysis system 110 as an example system for generating a workflow scheduling policy 308 based on system inputs. It will be appreciated that the predictive data analysis system 110 is provided as an example of an embodiment(s) and should not be construed to narrow the scope or spirit of the disclosure in any way. The depicted predictive data analysis system 110 of FIG. 3 may include a feature merging ML model 302 capable of receiving workflow packets 114 and state information packets 112. The feature merging ML model 302 may be further communicatively connected to a system prediction ML model 306. Additionally, FIG. 3 may include an ML cost/reward model 304 that takes as input state information packets 112 to provide an output cost/reward value to the system prediction ML model 306. The system prediction ML model 306 may provide a workflow scheduling policy 308 as an example output.

The feature merging ML model 302 may be any means including hardware, software, devices, or circuitry configured to receive data associated with a workflow packet 114 and state information packets 112 and generate a feature model capable of ingestion in a system prediction ML model 306. In some embodiments, the feature merging ML model 302 may receive as input the number of packets associated with the workflow packet 114; the type of data contained in the data packets, the source of the workflow packet 114; the size of the data packet; the frequency of the packets; the protocol associated with the workflow packet 114; the encoding of the workflow packet 114; the packet data category 404 and associated priority of the workflow packet 114; and/or other explicit or implied data extracted from the workflow packet 114. Further, in some embodiments, the feature merging ML model 302 may receive as input the processor utilization, memory utilization, and power state of a packet processing core 102; the physical distance from the packet processing core 102 to the load balancing unit 104; the temperature of the packet processing core 102; the security state of the packet processing core 102; and/or other explicit or implied data extracted from the state information packets 112. The feature merging ML model 302 may, in some embodiments, combine the received data elements (e.g., concatenated, merged, averaged, summed up, and/or the like) to generate a feature model capable of ingestion in the system prediction ML model 306.

The ML cost/reward model 304 may be any means including hardware, software, devices, or circuitry configured to receive state information packets 112 and additional dynamic load balancing system 100 feedback related to the packet processing cores 102a-n, the load balancing unit 104, the communication network 106, and other system components and determine a cost or reward value indicative of the overall operation of the system 100. This may include but is not limited to the power consumption of the system, the processor utilization, the average latency of operations, an/or the like. In some embodiments, the cost/reward value may be one-dimensional, for example, considering the power consumption of the system, the average execution time of a workflow, the quality of service, or other similar characteristics alone. In some embodiments, the generated cost/reward value may be a multi-dimensional value accounting for a balance of system properties such as power consumption, average workflow execution time, execution time of an individual workflow, prioritization of critical workflows, and/or other similar dynamic load balancing system 100 feedback. In some embodiments, the cost/reward value or set of values generated by the ML cost/reward model 304 may be transmitted to the system prediction ML model 306 for determining the workflow scheduling policy 308.

The system prediction ML model 306 may be any means including hardware, software, devices, or circuitry configured to receive a feature model comprising system and/or environment data, as well as a cost/reward value or set of values and output a workflow scheduling policy 308 or policy update based on machine learning techniques. In some embodiments, a system prediction ML model 306 may be implemented as a reinforcement learning algorithm. An RL algorithm may receive as input a feature vector generated by the feature merging ML model 302. The feature vector may represent the state of the environment encompassing the received workflow packet 114, the load balancing unit 104, the communication network 106, and the packet processing cores 102a-n. Based on the state of the environment, a workflow scheduling policy 308 may be generated. In some embodiments, the workflow scheduling policy 308 may be a determination of the network node preferred for processing a workflow packet 114. In some embodiments, the system prediction ML model 306 may generate a workflow scheduling policy 308 to optimize a particular parameter, such as power consumption, or specific set of parameters, such as power consumption and average workflow execution time or latency. Still other embodiments may seek to optimize power consumption of the dynamic load balancing system 100, overall execution time, average execution time, security, operating temperature, and/or any combination thereof. The system prediction ML model 306 may measure the effect of a workflow scheduling policy 308 or a policy update on the dynamic load balancing system 100 environment through the cost/reward value generated by the ML cost/reward model 304. Utilizing the reinforcement learning techniques, including exploration and exploitation policies, the system prediction ML model 306 may generate an initial workflow scheduling policy 308 for received workflow packets 114. The system prediction ML model 306 may then adjust or update the workflow scheduling policy 308 based on feedback provided by the ML cost/reward model 304. In some embodiments, the system prediction ML model 306 may retain policy updates that improve the cost/reward value (exploitation). In other embodiments, the system prediction ML model 306 may retain, at randomly determined intervals, policy updates that result in a worse cost/reward value (exploration). By employing exploration/exploitation techniques, the RL algorithm may work to iteratively improve the cost/reward value for a given set of inputs.

Although the system prediction ML model 306 is described primarily in the context of an RL algorithm, it should be understood that any of a variety of artificial intelligence learning mechanisms may be utilized, including Model Predictive Control, Genetic Algorithms, Particle Swarm Optimization, Simulated Annealing, grid search, and/or a variety of other techniques and methodologies to supervised or unsupervised learning, to reach a desired workflow scheduling policy 308.

FIG. 4 depicts a data diagram of example packet description data for a workflow packet 114 comprising a packet size 402, a packet data category 404, a packet source 406, a number of packets associated with the workflow 408, a frequency of workflow packets 410, a packet protocol 412, and a packet encoding 414. It will be appreciated that the depicted workflow packet 114 is provided as an example of an embodiment(s) and should not be construed to narrow the scope or spirit of the disclosure in any way, as a workflow packet 114 may comprise any number of data elements characteristic of the content and/or composition of the workflow packet 114.

As depicted in FIG. 4, the workflow packet 114 may contain a packet size 402 parameter. The packet size 402 may be any indicator of the size of the workflow packet 114, for example, the size in bits, bytes, words, and/or any other indicator of size. In some embodiments, the packet size 402 may include the header and trailer in addition to the payload. In other embodiments, the packet size 402 may refer only to the payload. The workflow packet 114 may also contain a packet data category 404 parameter. The packet data category 404 may be any indicator of the category of data associated with the workflow packet 114. For example, the packet data category 404 may indicate a workflow packet 114 containing video data, audio data, file data, position data, or any other category of data known to a person of ordinary skill in the art.

The workflow packet 114 may also contain a packet source 406 parameter. The packet source 406 may be any indicator of the source of the workflow packet 114. For example, the packet source 406 may indicate an internet protocol (IP) address, a MAC address, a web address, a name, or any similar indicator known to a person of ordinary skill in the art. The workflow packet 114 may further contain a number of packets associated with the workflow 408 parameter. The number of packets associated with the workflow 408 parameter may be any indicator representing the number of packets that are associated with the incoming workflow. In some embodiments, the workflow packet 114 may be the only packet in the workflow, while in other embodiments the workflow packet 114 may be a single packet in a plurality of packets associated with a single workflow. The number of packets associated with the workflow 408 may indicate the number of packets contained in the workflow.

The workflow packet 114 may also contain a frequency of workflow packets 410 parameter. The frequency of workflow packets 410 parameter may be any indicator representing the rate at which packets associated with a single workflow are transmitted. In some embodiments, the workflow may send workflow packets 114 at a consistent interval, for example, thirty (3) workflow packets 114 per second. The frequency of workflow packets 410 parameter may indicate this frequency and may be any frequency based upon the intended application of the system 100.

The workflow packet 114 may also contain a packet protocol 412 parameter. The packet protocol 412 may be any indicator of the protocol of the workflow packet 114. For example, the workflow packet 114 may be include raw IP data, internet control message protocol (ICMP), user datagram protocol (UDP), transmission control protocol (TCP), internet group management protocol (IGMP), Peripheral Component Interconnect (PCI) protocol, Accelerated Graphics Port (AGP) protocol, or any other similar network or system protocol commonly known to a person of ordinary skill in the art. In some embodiments, the packet protocol 412 may be used by the dynamic load balancing system 100 to determine the type and/or priority of the included data. The workflow packet 114 may further contain a packet encoding 414 parameter. The packet encoding 414 parameter may be any indicator representing the encoding of the accompanying data. In some embodiments, the encoding may represent a high level indicator of the type of data and compression, for example, audio, text, video, lossless, lossy, uncompressed, and so forth. In some embodiments, the packet encoding 414 parameter may indicate the specific type of encoding, such as FFmpeg, MPEG-1, MPEG-2, JPEG, or other similar encoding known to a person of ordinary skill in the art.

FIG. 5 depicts a data diagram for an example state information packet 112 including a processor utilization 502 parameter, a PPC distance 504 parameter, a power state 506 parameter, an operating temperature 508 parameter, a security state 510 parameter, and a memory utilization 512 parameter. It will be appreciated that the depicted state information packet 112 is provided as an example of an embodiment(s) and should not be construed to narrow the scope or spirit of the disclosure in any way, as a state information packet 112 may include any number of PPC state characteristics related to the operation of the PPC or flow of data.

The state information packet 112 may contain a processor utilization 502 that may be any indicator representative of the processor's utilization of available resources for a specific packet processing core 102. In some embodiments, the processor utilization 502 may represent the amount of time and/or clock cycles the processor is engaged in executing instructions in relation to the total time available. For example, the processor utilization 502 parameter may indicate the packet processing core's 102 utilization in instructions per cycle. In some embodiments, the system prediction ML model 306 may use the processor utilization 502 parameter from each of the packet processing cores 102a-n to determine the workflow scheduling policy 308.

The state information packet 112 may also contain a PPC distance 504 parameter. The PPC distance 504 parameter may be any indicator of the distance between the specific packet processing core 102 and the load balancing unit 104. In some embodiments, the PPC distance 504 parameter may represent the physical distance in terms of the length of the connection whether wired or wireless. In other embodiments, the PPC distance 504 parameter may represent the number of network nodes, or other components situated between the load balancing unit 104 and the packet processing core 102. The PPC distance 504 parameter may also be represented by the average time elapsed during transmission of a signal from the load balancing unit 104 to the packet processing core 102. In some embodiments, the PPC distance 504 parameter may be automatically determined during operation. In other embodiments, the PPC distance 504 parameter may be manually input to the packet processing core 102 by a user before or during operation. In some embodiments, the system prediction ML model 306 may use the PPC distance 504 parameter from each of the packet processing cores 102a-n to determine the workflow scheduling policy 308.

With continued reference to FIG. 5, the state information packet 112 may contain a power state 506 parameter. The power state 506 parameter may be any indicator of the power state and/or the power utilization of the packet processing core 102. In some embodiments, a packet processing core 102 may comprise multiple power states. Each state may be associated with a different operating frequency. In general, higher operating frequencies and/or voltages are associated with faster processing and greater power consumption. In some embodiments, the power state 506 parameter may indicate the power state by an enumerated representative alphanumeric code, such as power state P0, P1, C0, C1, 2, 3, etc. In some embodiments, the power state may be represented by the operating frequency, such as 2.1 GHz, 3.0 GHz, 3.3 GHz, etc. In some embodiments, the power state 506 parameter may represent the power utilization of the packet processing core 102. For example, the power state 506 may indicate the wattage consumed by the packet processing core 102. In some embodiments, the system prediction ML model 306 may use the power state 506 parameter from each of the packet processing cores 102a-n to determine the workflow scheduling policy 308.

The state information packet 112 may also contain an operating temperature 508 parameter. The operating temperature 508 parameter may be any indicator of the temperature of the packet processing core 102 during operation measured at any location on the packet processing core 102 or may be a combination or average of a number of temperature readings to provide a spatial and/or temporal representation of the temperature of the packet processing core 102. In some embodiments, the system prediction ML model 306 may use the operating temperature 508 parameter from each of the packet processing cores 102a-n to determine the workflow scheduling policy 308.

The state information packet 112 may also contain a security state 510 parameter. The security state 510 parameter may be any indicator of the security of a given packet processing core 102. For example, the security state 510 may represent a level of system security based on an internal or external determination, such as, high, medium, low, breach, and/or the like. In some embodiments, the security state 510 parameter may represent a binary level of security, such as, secure or unsecure. In some embodiments, the system prediction ML model 306 may use the security state 510 parameter from each of the packet processing cores 102a-n to determine the workflow scheduling policy 308.

The state information packet 112 may further contain a memory utilization 512 parameter. The memory utilization 512 parameter may be any indicator representative of the packet processing core's 102 utilization of available memory resources. In some embodiments, the memory utilization 512 parameter may represent the amount of the packet processing core's 102 memory in use at a given time. In some embodiments, the memory utilization 512 may represent the utilization of volatile memory, non-volatile memory, or both volatile and non-volatile memory. In some embodiments, the system prediction ML model 306 may use the security state 510 parameter from each of the packet processing cores 102a-n to determine the workflow scheduling policy 308.

FIG. 6 provides a flowchart illustrating a process 600 for determining a packet processing core 102 for processing, in accordance with one or more embodiments of the present disclosure. At block 602, the load balancing unit 104 may receive a workflow packet 114, wherein the workflow packet 114 includes packet description data indicative of at least a packet structure and a packet priority. In some embodiments, the packet description data may comprise data contained in the workflow packet 114 as described above with reference to FIG. 4. Many data parameters contained in the workflow packet 114 may be indicative of the packet's structure. In some embodiments, parameters indicative of the packet's structure may include but are not limited to the packet size 402, the number of packets associated with the workflow 408, the frequency of workflow packets 410, and other similar parameters. Similarly, many data parameters contained in the workflow packet 114 may be indicative of a packet's priority, including but not limited to, the packet data category 404, the packet source 406, the packet protocol 412, and/or the packet encoding 414.

At block 604, the load balancing unit 104 may receive, from the plurality of packet processing cores 102a-n, state data indicative of at least a utilization state and an operating state of each of the respective packet processing cores (e.g., 102a, 102b, 102c, . . . 102n) from amongst the plurality of packet processing cores 102a-n. In some embodiments, the state data may include data contained in the state information packets 112 as described in FIG. 5. In some embodiments, many data parameters contained in the state information packets 112 may be indicative of the utilization state of the packet processing core 102, including but not limited to, the processor utilization 502, the power state 506, and/or the memory utilization 512.

At block 606, the load balancing unit 104 may determine a selected packet processing core 102 from amongst the plurality of packet processing cores 102a-n based on the state data of the packet processing core 102 and the packet description data of the workflow packet 114. In some embodiments, the load balancing unit 104 may utilize a predictive data analysis system 110 as described in FIG. 3 to determine the workflow scheduling policy 308, including the selected packet processing core 102 for the workflow packet 114. In other embodiments, the load balancing unit 104 may determine the selected packet processing core 102 based on a comparison of state data and/or packet description data.

At block 608, the load balancing unit 104 may transmit the workflow packet 114 to the selected packet processing core 102. Upon determination of the selected packet processing core 102, the load balancing unit 104 may transmit the workflow packet 114 to the selected packet processing core 102 via the communication network 106 to execute the contained instructions. Upon completion, in some embodiments, the selected packet processing core 102 may communicate state information through a state information packet 112 and may further include processing and delay times associated with the processed transactions for use by the predictive data analysis system 110 and/or the load balancing unit 104 in further adjusting the scheduling policy. As would be evident in light of the operations described herein, the determination of the selected packet processing core in FIG. 6 may be iteratively performed in order to iteratively improve this determination. For example, FIG. 6 may occur as part of a feedback look in which workflow packets 114 are iteratively provided to particular packet processing cores 102 and subsequent determinations of the selected packet processing core may be improved based upon the manner in which the workflow packet 114 is executed by these cores 102.

FIG. 7 provides a flowchart illustrating a process 700 for determining a packet processing core 102 based on processor utilization 502 and further based on memory utilization 512, in accordance with one or more embodiments of the present disclosure. At block 702, the load balancing unit 104 may receive a workflow packet 114, wherein the workflow packet 114 includes packet description data indicative of at least a packet structure and a packet priority. In some embodiments, the packet description data may include data contained in the workflow packet 114 as described in FIG. 4. As discussed with reference to FIG. 6, parameters indicative of the packet's structure may include the packet size 402, the number of packets associated with the workflow 408, the frequency of workflow packets 410, an/or the like. Parameters indicative of the packet's priority may include the packet data category 404, the packet source 406, the packet protocol 412, and/or the packet encoding 414 as described above.

At block 704, the load balancing unit 104 may receive, from the plurality of packet processing cores 102a-n, state data indicative of at least a utilization state and an operating state of each of the respective packet processing cores (102a, 102b, 102c, . . . 102n) from amongst the plurality of packet processing cores 102a-n. In some embodiments, the state data may include data contained in the state information packets 112 as described with reference to FIG. 5. In some embodiments, several data parameters contained in the state information packets 112 may be indicative of the utilization state of the packet processing core 102, including but not limited to, the processor utilization 502, the power state 506, and/or the memory utilization 512.

At block 706, the load balancing unit 104 may compare the processor utilization 502 values of the plurality of packet processing cores 102a-n. In some embodiments, the load balancing unit 104 may utilize the predictive data analysis system 110 to compare processor utilization 502 values. In such an embodiment, the processor utilization 502 values may be used as input to the feature merging ML model 302. In other embodiments, the load balancing unit 104 may compare processor utilization 502 values from the plurality of packet processing cores 102a-n.

At block 708, the load balancing unit 104 may determine the selected packet processing core 102 based upon the comparison of the memory utilization 512 values. In some embodiments, the load balancing unit 104 may utilize the predictive data analysis system 110 as described in FIG. 3 to determine the workflow scheduling policy 308 which may be used to select a packet processing core 102. In other embodiments, the load balancing unit 104 may determine the packet processing core 102 based on a comparison of the processor utilization 502 from each of the plurality of packet processing cores 102a-n. In such embodiments, the load balancing unit 104 may, for example, select the packet processing core 102 with the lowest processor utilization 502.

At block 710, the load balancing unit 104 may compare the memory utilization 512 values of the plurality of packet processing cores 102a-n. In some embodiments, the load balancing unit 104 may utilize the predictive data analysis system 110 to compare memory utilization 512 values. In such an embodiment, the memory utilization 512 values may be used as input to the feature merging ML model 302. In other embodiments, the load balancing unit 104 may compare memory utilization 512 values from the plurality of packet processing cores 102a-n.

At block 712, the load balancing unit 104 may update the selected packet processing core 102 based upon the comparison of the memory utilization 512 values. In some embodiments, the load balancing unit 104 may utilize the predictive data analysis system 110 as described in FIG. 3 to analyze the memory utilization 512 values in combination with the processor utilization 502 values for each of the packet processing cores 102a-n and determine an update to the selected packet processing core 102 based on the workflow scheduling policy 308. In some embodiments, the load balancing unit 104 may determine the packet processing core 102 based on a comparison of the memory utilization 512 from each of the plurality of packet processing cores 102a-n. In such embodiments, the load balancing unit 104 may, for example, select the packet processing core 102 with the lowest memory utilization 512. In some embodiments, for example, the load balancing unit 104 may select the packet processing core 102 which optimizes processor utilization 502 and memory utilization 512 when compared across the packet processing cores 102a-n.

At block 714, the load balancing unit 104 may transmit the workflow packet 114 to the selected packet processing core 102. Upon determination of the selected packet processing core 102, the load balancing unit 104 may transmit the workflow packet 114 to the selected packet processing core 102 via the communication network 106 to execute the contained instructions. Upon completion, in some embodiments, the selected packet processing core 102 may communicate state information through state information packets 112 and may further include processing and delay times associated with the processed transactions for use by the predictive data analysis system 110 and/or the load balancing unit 104 in further adjusting the scheduling policy.

FIG. 8 provides a flowchart illustrating a process 800 for determining a packet processing core 102 based on a power state 506 parameter and further based on a PPC distance 504, in accordance with one or more embodiments of the present disclosure. At block 802, the load balancing unit 104 may receive a workflow packet 114 that includes packet description data indicative of at least a packet structure and a packet priority. In some embodiments, the packet description data may comprise data contained in the workflow packet 114 as described in FIG. 4.

At block 804, the load balancing unit 104 may receive, from a plurality of packet processing cores 102a-n, state data indicative of at least a utilization state and an operating state of each of the respective packet processing cores (102a, 102b, 102c, . . . 102n) from amongst the plurality of packet processing cores 102a-n. In some embodiments, the state data may include data contained in the state information packets 112 as described in FIG. 5. In some embodiments, several data parameters contained in the state information packets 112 may be indicative of the utilization state of the packet processing core 102, including but not limited to, the processor utilization 502, the power state 506, and/or the memory utilization 512.

At block 806, the load balancing unit 104 may compare the power state 506 values of the plurality of packet processing cores 102a-n. In some embodiments, the load balancing unit 104 may utilize the predictive data analysis system 110 to compare power state 506 values. In such an embodiment, power state 506 values may be used as input to the feature merging ML model 302. In other embodiments, the load balancing unit 104 may compare power state 506 values from the plurality of packet processing cores 102a-n.

At block 808, the load balancing unit 104 may determine the selected packet processing core 102 based upon the comparison of the power state 506 values. In some embodiments, the load balancing unit 104 may utilize the predictive data analysis system 110 as described in FIG. 3 to determine the workflow scheduling policy 308 that may be used to select a packet processing core 102. In other embodiments, the load balancing unit 104 may determine the packet processing core 102 based on a comparison of the power state 506 from each of the plurality of packet processing cores 102a-n. In such embodiments, the load balancing unit 104 may, for example, select the packet processing core 102 in the lowest power state 506, perhaps exemplified by the lowest operating frequency.

At block 810, the load balancing unit 104 may compare the PPC distance 504 values of the plurality of packet processing cores 102a-n. In some embodiments, the load balancing unit 104 may utilize the predictive data analysis system 110 to compare PPC distance 504 values. In such an embodiment, PPC distance 504 values may be used as input to the feature merging ML model 302. In other embodiments, the load balancing unit 104 may compare PPC distance 504 values from the plurality of packet processing cores 102a-n.

At block 812, the load balancing unit 104 may update the selected packet processing core 102 based upon the comparison of the PPC distance 504 values. In some embodiments, the load balancing unit 104 may utilize the predictive data analysis system 110 as described in FIG. 3 to analyze the PPC distance 504 values in combination with the power state 506 values for each of the packet processing cores 102a-n and determine an update to the selected packet processing core 102 based on the workflow scheduling policy 308. In some embodiments, the load balancing unit 104 may determine the packet processing core 102 based on a comparison of the PPC distance 504 values from each of the plurality of packet processing cores 102a-n. In such embodiments, a load balancing unit 104 may, for example, select the packet processing core 102 with the shortest PPC distance 504 or the PPC distance 504 that represents passing the workflow packet 114 through the least number of network nodes. In some embodiments, for example, the load balancing unit 104 may select the packet processing core 102 that optimizes the power state 506 and PPC distance 504 when compared across the packet processing cores 102a-n to find a solution that optimizes power consumption with system performance.

At block 814, the load balancing unit 104 may transmit the workflow packet 114 to the selected packet processing core 102. Upon determination of the selected packet processing core 102, the load balancing unit 104 may transmit the workflow packet 114 to the selected packet processing core 102 via the communication network 106 to execute the contained instructions. Upon completion, in some embodiments, the selected packet processing core 102 may communicate state information through state information packets 112 and may further include processing and delay times associated with the processed transactions for use by the predictive data analysis system 110 and/or the load balancing unit 104 in further adjusting the scheduling policy.

FIG. 9 provides a flowchart illustrating a process 900 for determining a packet processing core 102 based on a priority category, in accordance with one or more embodiments of the present disclosure. At block 902, the load balancing unit 104 may receive the workflow packet 114 that includes packet description data indicative of at least a packet structure and a packet priority. In some embodiments, the packet description data may include data contained in the workflow packet 114 as described in FIG. 4.

At block 904, the load balancing unit 104 may receive, from the plurality of packet processing cores 102a-n, state data indicative of at least a utilization state and an operating state of each of the respective packet processing cores (102a, 102b, 102c, . . . 102n) from amongst the plurality of packet processing cores 102a-n. In some embodiments, the state data may include data contained in the state information packets 112 as described in FIG. 5. In some embodiments, many data parameters contained in the state information packets 112 may be indicative of the utilization state of the packet processing core 102, including but not limited to, the processor utilization 502, the power state 506, and/or the memory utilization 512.

At block 906, the load balancing unit 104 may compare the state data of the plurality of packet processing cores 102a-n. In some embodiments, the load balancing unit 104 may utilize the predictive data analysis system 110 to compare the state data contained in the state information packets 112. In such an embodiment, state data values may be used as input to the feature merging ML model 302. In other embodiments, the load balancing unit 104 may compare the state data contained in the state information packets 112 from the plurality of packet processing cores 102a-n.

At block 908, the load balancing unit 104 may determine the selected packet processing core 102 based upon the priority category of the workflow packet 114 and the comparison of state data of the plurality of packet processing cores 102a-n. In some embodiments, the packet priority may be defined by the workflow packet 114. For example, the workflow packet 114 may include an indicator signifying the priority level of the workflow packet 114, such as, high, medium, or low. In some embodiments, the priority category may be defined by the packet data category 404, for example, video data may be assigned a higher priority than audio data, and audio data may be assigned a higher priority than file data. In some embodiments, the priority category may be defined by the packet source 406, for example, a workflow packet 114 from a certain IP or web source may be assigned a higher priority. Still, in some embodiments, the priority category may be defined by the packet protocol 412, for example, TCP packets may be given a higher priority than UDP packets. In some embodiments, the priority category may be defined by packet encoding 414, for example, a workflow packet 114 encoded using FFmpeg may be assigned a higher priority than a workflow packet 114 encoded using MPEG-1. In other embodiments, a priority category may be defined using any combination of data contained in the workflow packet 114 that may be used to define a prioritization, for example, the ingress port and/or the destination port. Once a priority category of the workflow packet 114 is identified, in some embodiments, the load balancing unit 104 may utilize the predictive data analysis system 110 as described in FIG. 3 to determine the workflow scheduling policy 308 which may be used to select the packet processing core 102. In other embodiments, the load balancing unit 104 may determine the packet processing core 102 based on a priority category, for example, selecting the packet processing core 102 with the shortest queue to process a workflow packet 114 of higher priority.

At block 910, the load balancing unit 104 may transmit the workflow packet 114 to the selected packet processing core 102. Upon determination of the selected packet processing core 102, the load balancing unit 104 may transmit the workflow packet 114 to the selected packet processing core 102 via the communication network 106 to execute the contained instructions. Upon completion, in some embodiments, the selected packet processing core 102 may communicate state information through state information packets 112 and may further include processing and delay times associated with the processed transactions for use by the predictive data analysis system 110 and/or the load balancing unit 104 in further adjusting the scheduling policy.

FIG. 10 provides a flowchart illustrating a process 1000 for determining a packet processing core 102 based on the packet source 406, in accordance with one or more embodiments of the present disclosure. At block 1002, the load balancing unit 104 may receive a workflow packet 114 that includes packet description data indicative of at least a packet structure and a packet priority. In some embodiments, the packet description data may include data contained in the workflow packet 114 as described in FIG. 4. In some embodiments, many data parameters contained in the workflow packet 114 may be indicative of a packet's priority, including but not limited to, the packet data category 404, the packet source 406, the packet protocol 412, and the packet encoding 414.

At block 1004, the load balancing unit 104 may receive, from the plurality of packet processing cores 102*a*-*n*, state data indicative of at least a utilization state and an operating state of each of the respective packet processing cores (102*a*, 102*b*, 102*c*, . . . 102*n*) from amongst the plurality of packet processing cores 102*a*-*n*. In some embodiments, the state data may include data contained in the state information packets 112 as described in FIG. 5. In some embodiments, many data parameters contained in the state information packets 112 may be indicative of the utilization state of the packet processing core 102, including but not limited to, the processor utilization 502, the power state 506, and/or the memory utilization 512.

At block 1006, the load balancing unit 104 may compare the state data of the plurality of packet processing cores 102*a*-*n*. In some embodiments, the load balancing unit 104 may utilize the predictive data analysis system 110 to compare the state data contained in the state information packets 112. In such an embodiment, the state data values may be used as input to the feature merging ML model 302. In other embodiments, the load balancing unit 104 may compare the state data contained in the state information packets 112 from the plurality of packet processing cores 102*a*-*n*.

At block 1008, the load balancing unit 104 may determine the selected packet processing core 102 based upon the comparison of the packet source 406 values. In some embodiments, the load balancing unit 104 may utilize the predictive data analysis system 110 as described in FIG. 3 using the packet source 406 as an input to determine a workflow scheduling policy 308 which may be used to select a packet processing core 102. In other embodiments, the load balancing unit 104 may determine the packet processing core 102 based on the packet source 406. In such embodiments, the load balancing unit 104 may, for example, select the packet processing core 102 configured to more efficiently handle data from a specified packet source 406. In other embodiments, the load balancing unit 104 may, for example, assign the packet processing core 102 with less traffic based on a packet source 406 known to provide workflow packets 114 containing large amounts of data or data that is difficult to process.

At block 1010, the load balancing unit 104 may transmit the workflow packet 114 to the selected packet processing core 102. Upon determination of the selected packet processing core 102, the load balancing unit 104 may transmit the workflow packet 114 to the selected packet processing core 102 via the communication network 106 to execute the contained instructions. Upon completion, in some embodiments, the selected packet processing core 102 may communicate state information through state information packets 112 and may further include processing and delay times associated with the processed transactions for use by the predictive data analysis system 110 and/or the load balancing unit 104 in further adjusting the scheduling policy.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to a network interface environment, however, one skilled in the art may recognize that such principles may be applied to any scheduler receiving commands and/or transactions and having access to two or more processing cores. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. A computer-implemented method comprising:
   receiving a workflow packet, wherein the workflow packet comprises packet description data indicative of at least a packet structure and a packet priority;
   receiving, from a plurality of packet processing cores, state data indicative of at least a utilization state defining a plurality of power states for each of the plurality of packet processing cores and an operating state of each of the respective packet processing cores from amongst the plurality of packet processing cores, wherein each of the plurality of packet processing cores are configured to operate at least at:
      a first power state associated with a first operating frequency; or
      a second power state associated with a second operating frequency;
   generating, by a system prediction machine learning (ML) model, a workflow scheduling policy based on at least the state data of the packet processing core and the packet description data of the workflow packet;
   determining a selected packet processing core from amongst the plurality of packet processing cores based on the workflow scheduling policy; and
   transmitting the workflow packet to the selected packet processing core.

2. The computer-implemented method of claim 1, wherein the state data indicative of the utilization state defines a processor utilization value for each of the plurality of packet processing cores, and wherein determining the selected packet processing core from amongst the plurality of packet processing cores further comprises:
   comparing the processor utilization values of the plurality of packet processing cores; and
   determining the selected packet processing core based upon the comparison of the processor utilization values.

3. The computer-implemented method of claim 2, wherein the state data indicative of the utilization state further defines a memory utilization value for each of the plurality of packet processing cores and wherein determining the selected packet processing core from amongst the plurality of packet processing cores further comprises:
   comparing the memory utilization values of the plurality of packet processing cores; and
   updating the selected packet processing core based upon the comparison of the memory utilization values.

4. The computer-implemented method of claim 1, wherein determining the selected packet processing core from amongst the plurality of packet processing cores further comprises:
   comparing the power states of the plurality of packet processing cores; and
   determining the selected packet processing core based upon the comparison of the power states.

5. The computer-implemented method of claim 4, wherein the state data indicative of the operating state defines a physical distance between the respective packet processing core and a load balancing unit for each of the plurality of packet processing cores, and wherein determining the selected packet processing core from amongst the plurality of packet processing cores further comprises:
   comparing the physical distance from the load balancing unit of the plurality of packet processing cores; and
   updating the selected packet processing core based upon the comparison of the physical distance.

6. The computer-implemented method of claim 1, wherein the packet description data indicative of packet priority defines a plurality of priority categories comprising at least a first priority category and a second priority category, and wherein determining the selected packet processing core further comprises:
   comparing the state data of the plurality of packet processing cores; and
   determining the selected packet processing core based upon the priority category of the workflow packet and the comparison of the state data of the plurality of packet processing cores.

7. The computer-implemented method of claim 1, wherein the packet description data indicative of packet priority defines a packet source, and determining the selected packet processing core further comprises:
   comparing the state data of the plurality of packet processing cores; and
   determining the selected packet processing core based upon the packet source of the workflow packet and the comparison of the state data of the plurality of packet processing cores.

8. The computer-implemented method according to claim 1, further comprising:
   receiving, by a feature merging ML model, the packet description data indicative of at least the packet structure and the packet priority of the workflow packet; and
   generating a feature model that is ingested by the system prediction ML model,
   wherein determining the selected packet processing core is based at least partially on the generated feature model.

9. The computer-implemented method according to claim 1, further comprising:
   receiving, by a cost/reward ML model, the state data for each of the plurality of packet cores; and
   determining a cost/reward value set for the plurality of packet cores that is ingested by the system prediction ML model,
   wherein determining the workflow scheduling policy is based at least partially on the generated cost/reward value set.

10. A system comprising:
    a plurality of packet processing cores; and
    a load balancing unit communicatively connected to the plurality of packet processing cores, wherein the load balancing unit is configured to:

receive a workflow packet comprising packet description data indicative of at least a packet structure and a packet priority;
receive, from the plurality of packet processing cores, state data indicative of at least a utilization state defining a plurality of power states for each of the plurality of packet processing cores and an operating state of each of the respective packet processing cores from amongst the plurality of packet processing cores, wherein each of the plurality of packet processing cores are configured to operate at least at:
a first power state associated with a first operating frequency; or
a second power state associated with a second operating frequency;
generate, by a system prediction machine learning (ML) model, a workflow scheduling policy based on at least the state data of the packet processing core and the packet description data of the workflow packet;
determine a selected packet processing core from amongst the plurality of packet processing cores based on the workflow scheduling policy; and
transmit the workflow packet to the selected packet processing core.

11. The system of claim 10, wherein the state data indicative of the utilization state defines a processor utilization value for each of the plurality of packet processing cores, and wherein the load balancing unit is further configured to determine the selected packet processing core from amongst the plurality of packet processing cores by:
comparing the processor utilization values of the plurality of packet processing cores; and
determining the selected packet processing core based upon the comparison of the processor utilization values.

12. The system of claim 11, wherein the state data indicative of the utilization state further defines a memory utilization value for each of the plurality of packet processing cores, and wherein the load balancing unit is further configured to determine the selected packet processing core from amongst the plurality of packet processing cores by:
comparing the memory utilization values of the plurality of packet processing cores; and
updating the selected packet processing core based upon the comparison of the memory utilization values.

13. The system of claim 10, wherein the load balancing unit is further configured to determine the selected packet processing core from amongst the plurality of packet processing cores by:
comparing the power states of the plurality of packet processing cores; and
determining the selected packet processing core based upon the comparison of the power states.

14. The system of claim 13, wherein the state data indicative of the operating state defines a physical distance between the respective packet processing core and the load balancing unit for each of the plurality of packet processing cores, and wherein the load balancing unit is further configured to determine the selected packet processing core from amongst the plurality of packet processing cores by:
comparing the physical distance from the load balancing unit of the plurality of packet processing cores; and
updating the selected packet processing core based upon the comparison of the physical distance.

15. The system of claim 10, wherein the packet description data indicative of packet priority defines a plurality of priority categories comprising at least a first priority category and a second priority category, and wherein the load balancing unit is further configured to determine the selected packet processing core by:
comparing the state data of the plurality of packet processing cores; and
determining the selected packet processing core based upon the priority category of the workflow packet and the comparison of the state data of the plurality of packet processing cores.

16. The system of claim 10, wherein the packet description data indicative of packet priority defines a packet source, and wherein the load balancing unit is further configured to determine the selected packet processing core by:
comparing the state data of the plurality of packet processing cores; and
determining the selected packet processing core based upon the packet source of the workflow packet and the comparison of the state data of the plurality of packet processing cores.

17. A computer program product comprising at least one non-transitory computer-readable storage medium having computer program code thereon that, in execution with at least one processor, configures the computer program product for:
receiving a workflow packet, wherein the workflow packet comprises packet description data indicative of at least a packet structure and a packet priority;
receiving, from a plurality of packet processing cores, state data indicative of at least a utilization state defining a plurality of power states for each of the plurality of packet processing cores and an operating state of each of the respective packet processing cores from amongst the plurality of packet processing cores, wherein each of the plurality of packet processing cores are configured to operate at least at:
a first power state associated with a first operating frequency; or
a second power state associated with a second operating frequency;
generating, by a system prediction machine learning (ML) model, a workflow scheduling policy based on at least the state data of the packet processing core and the packet description data of the workflow packet;
determining a selected packet processing core from amongst the plurality of packet processing cores based on the workflow scheduling policy; and
transmitting the workflow packet to the selected packet processing core.

18. The computer program product of claim 17, wherein the state data indicative of the utilization state defines a processor utilization value for each of the plurality of packet processing cores, the computer program product further configured for:
comparing the processor utilization values of the plurality of packet processing cores; and
determining the selected packet processing core based upon the comparison of the processor utilization values.

19. The computer program product of claim 18, wherein the state data indicative of the utilization state further defines a memory utilization value for each of the plurality of packet processing cores, the computer program product further configured for:
comparing the memory utilization values of the plurality of packet processing cores; and updating the selected packet processing core based upon the comparison of the memory utilization values.

20. The computer program product of claim 17, further configured for:
comparing the power states of the plurality of packet processing cores; and
determining the selected packet processing core based upon the comparison of the power states.

* * * * *